(12) United States Patent
Chen et al.

(10) Patent No.: US 10,802,159 B2
(45) Date of Patent: *Oct. 13, 2020

(54) LONG TERM REPEATABILITY OF DETERMINED POSITION IN GNSS NAVIGATION SYSTEM

(71) Applicant: Deere & Company, Moline, IL (US)

(72) Inventors: Yiqun Chen, Torrance, CA (US); Liwen L. Dai, Torrance, CA (US)

(73) Assignee: DEERE & COMPANY, Moline, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/687,544

(22) Filed: Nov. 18, 2019

(65) Prior Publication Data

US 2020/0088888 A1  Mar. 19, 2020

Related U.S. Application Data

(63) Continuation of application No. 15/285,409, filed on Oct. 4, 2016, now Pat. No. 10,481,275.

(60) Provisional application No. 62/281,522, filed on Jan. 21, 2016.

(51) Int. Cl.
| | | |
|---|---|---|
| *G01S 19/40* | (2010.01) | |
| *G01S 19/14* | (2010.01) | |
| *G01S 19/41* | (2010.01) | |
| *G01S 19/07* | (2010.01) | |

(52) U.S. Cl.
CPC ............. *G01S 19/40* (2013.01); *G01S 19/14* (2013.01); *G01S 19/41* (2013.01); *G01S 19/07* (2013.01)

(58) Field of Classification Search
CPC .......... G01S 19/40; G01S 19/07; G01S 19/14
See application file for complete search history.

(56) References Cited

U.S. PATENT DOCUMENTS

| | | |
|---|---|---|
| 2009/0177401 A1 | 7/2009 | Otsubo et al. |
| 2012/0046863 A1 | 2/2012 | Hope et al. |
| 2014/0292567 A1 | 10/2014 | Feldhaus et al. |

OTHER PUBLICATIONS

Deere & Company, International Search Report and Written Opinion, PCT/US2017/014250, dated Apr. 14, 2017, 12 pgs.

*Primary Examiner* — Cassi J Galt
(74) *Attorney, Agent, or Firm* — Morgan, Lewis & Bockius LLP

(57) ABSTRACT

A moveable object determines a preliminary position for the moveable object using received satellite navigation signals and satellite orbit correction information and satellite clock correction information. A position correction is determined by identifying which cell, of a predefined set of geographical cells, corresponds to the determined preliminary position, and obtaining from a database, pre-computed tectonic terrestrial plate position information for the identified cell. Based on the information for the identified cell, a tectonic terrestrial plate, corresponding to the determined preliminary position of the moveable object is identified. Based on the identified tectonic terrestrial plate, a position correction is determined, the position correction corresponding to the identified tectonic terrestrial plate and a reference epoch, and a corrected position of the moveable object is generated in accordance with the determined preliminary position of the moveable object and the determined position correction.

20 Claims, 13 Drawing Sheets

Global major plates: 1. Pacific, 2. Cocos, 3. Nazca, 4. Caribbean, 5. South America, 6. Antarctica, 7. India, 8. Australia, 9. Africa, 10. Arabia, 11. Eurasia, 12. North America, 13. Juan de Fuca, 14. Philippine, 15. Rivera, 16. Scotia

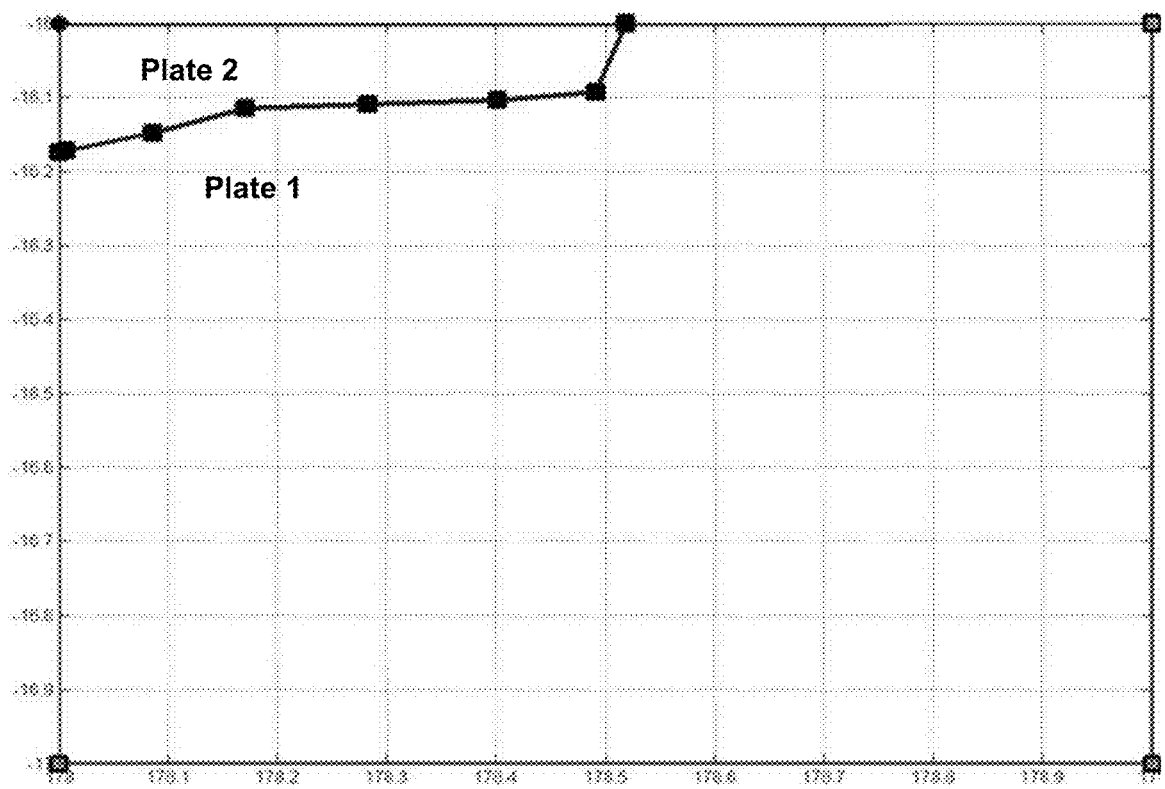
Figure 4B: A multi-plate cell (longitude: 178°~179°, latitude: -17°~-16°) that overlaps with two plates
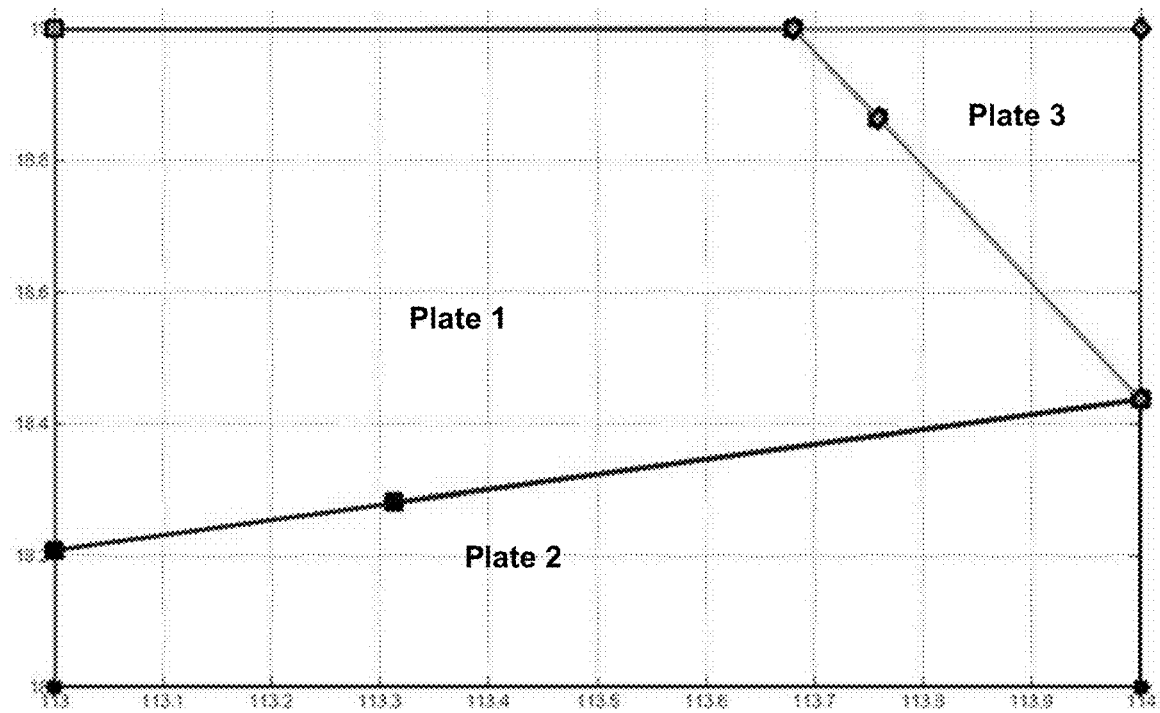
Figure 4C: A multi-plate cell (longitude: 113°~114°, latitude: 18°~19°) that overlaps with three plates

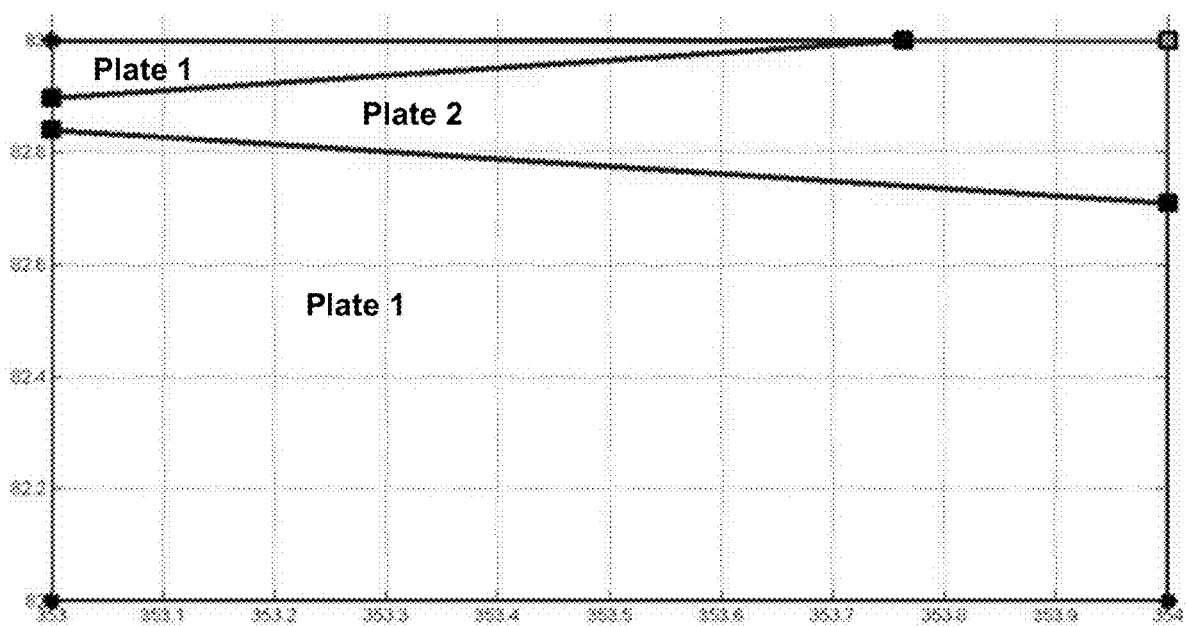
Figure 4D: A multi-plate cell (longitude: 353°~354°, latitude: 82°~83°) that overlaps with two plates in three parts In accordance with the determined position, identify a cell of a predefined set of geographical cells, ... — 608

(A)

The predefined set of geographical cells includes more than 15,000 distinct cells corresponding to distinct geographic regions of the geographic area, each distinct cell of the predefined set of geographical cells corresponds to a range of latitudes that does not exceed two degrees, and each distinct cell of the predefined set of geographical cells, other than cells corresponding to geographic regions that overlap the North and South poles of Earth, further corresponds to a range of longitudes that does not exceed two degrees — 620

Obtain, from a database established prior to performance of the method, pre-computed tectonic terrestrial plate position information for the identified cell ... — 610

(B)

The database is a database internally stored within a non-transitory computer readable storage medium of the moveable object — 622

The predefined set of geographical cells includes a first set of single-plate cells, each single-plate cell corresponding to a geographic region that falls entirely within a single respective tectonic terrestrial plate of the plurality of tectonic terrestrial plates, and, for each single-plate cell in the first set of single-plate cells, the database includes information identifying the single respective tectonic terrestrial plate — 624

The predefined set of geographical cells includes a second set of multi-plate cells, each multi-plate cell corresponding to a geographic region having two or more sub-regions that fall within distinct tectonic terrestrial plates of the plurality of tectonic terrestrial plates, and, for each multi-plate cell in the second set of multi-plate cells, the database includes information identifying, for each sub-region of the two or more sub-regions corresponding to the multi-plate cell, a respective tectonic terrestrial plate and corresponding geographic boundaries — 626

Obtain, from a database established prior to performance of the method, pre-computed tectonic terrestrial plate position information for the identified cell ... — 610

(E)

The database includes information identifying two or more polygons for each multi-plate cell in the second set of multi-plate cells, each polygon having an internal area corresponding to a respective sub-region of the geographic region for a respective multi-plate cell — 630

Determine, when the identified cell is multi-plate cell, which of the two of more sub-regions corresponding to the identified cell includes the determined position of the moveable object includes comparing the determined position with at least one polygon of the two or more polygons for the identified cell, until a determination is made as to which of the two or more polygons for the identified cell includes the determined position — 632

The information identifying two or more polygons for each multi-plate cell in the second set of multi-plate cells comprises an ordered list of polygons for each multi-plate cell in the second set of multi-plate cells, and information identifying a single respective tectonic terrestrial plate, of the plurality of tectonic terrestrial plates, as corresponding to each polygon — 634

Determine position of the moveable object (D) — 606

Generate, from the satellite navigation signals received from the plurality of satellites, and the satellite orbit correction information and satellite clock correction information for the plurality of satellites, satellite navigation data for the moveable object, the satellite navigation data for the moving object including code measurements and carrier phase measurements each satellite of the plurality of satellites — 636

Determine the position of the moveable object from the code measurements and carrier phase measurements of the plurality of satellites — 638

Figure 6C

Based on the obtained pre-computed tectonic terrestrial plate position information for the identified cell, identify a tectonic terrestrial plate, of the plurality of tectonic terrestrial plates, corresponding to the determined position of the moveable object ⟵ 612

(C) 

When the identified cell is a multi-plate cell, the method includes identifying the tectonic terrestrial plate, of the plurality of tectonic terrestrial plates, corresponding to the determined position of the moveable object by comparing the determined position with one or more polygons for the identified cell in an order specified by the ordered list of polygons for the identified cell ⟵ 640

The information in the internal database for each multi-plate cell in the second set of multi-plate cells includes a number of polygons for the multi-plate cell, and further includes a number, comprising a positive integer greater than one, corresponding to the number of polygons identified by the database for the multi-plate cell ⟵ 642

When the identified cell is a multi-plate cell, the method includes determining the number, N, of polygons identified by information in the database for the identified cell, and identifying the tectonic terrestrial plate, of the plurality of tectonic terrestrial plates, corresponding to the determined position of the moveable object by comparing the determined position with no more than N-1 of the polygons for the identified cell ⟵ 644

Based on the obtained pre-computed tectonic terrestrial plate position information for the identified cell, identify a tectonic terrestrial plate, of the plurality of tectonic terrestrial plates, corresponding to the determined position of the moveable object ⎯ 612

(F)

Identifying the tectonic terrestrial plate, of the plurality of tectonic terrestrial plates, corresponding to the determined position of the moveable object includes: ⎯ 650

When the identified cell is a single-plate cell, identifying, from the obtained pre-computed tectonic terrestrial plate position information for the identified cell, the single tectonic terrestrial plate corresponding to the identified cell, wherein the identified single tectonic terrestrial plate corresponding to the identified cell is identified as the tectonic terrestrial plate corresponding to the determined position of the moveable object ⎯ 652

When the identified cell is a multi-plate cell, determining which sub-region, of the two of more sub-regions corresponding to the identified cell, includes the determined position of the moveable object, and based on the determined sub-region, identifying, from the obtained pre-computed tectonic terrestrial plate position information for the identified cell, the tectonic terrestrial plate corresponding to the determined sub-region of the two of more sub-regions corresponding to the identified cell, wherein the identified tectonic terrestrial plate corresponding to the determined sub-region is identified as the tectonic terrestrial plate corresponding to the determined position of the moveable object ⎯ 654

Figure 6E

LONG TERM REPEATABILITY OF DETERMINED POSITION IN GNSS NAVIGATION SYSTEM

RELATED APPLICATIONS

This application is a continuation of U.S. patent application Ser. No. 15/285,409, filed Oct. 4, 2016, which claims priority to U.S. Provisional Patent Application No. 62/281,522, filed Jan. 21, 2016, which are hereby incorporated by reference in their entirety.

TECHNICAL DATA FIELD

The disclosed embodiments relate generally to navigation systems that determine the position of a moveable object using navigation signals received from a plurality of satellites, and more particularly to a system in which determined positions are repeatable with high precision over long periods of time, such as one or more years.

BACKGROUND

In any number of commercial and other applications, such as agricultural, oil exploration, mining, geological, and infrastructure projects, archeological explorations, and so on, it would be useful, and in some cases essential, to be able to return to "exactly" the same position, e.g., within a predefined level of precision, such as 10 cm, 5 cm, or 2 cm, at times separated by multiple months, years or even decades, despite "continental drift," sometimes called plate tectonics, which is the process by which a portion of Earth's upper surface moves over the mantle like a set of plates. When determining the position of a moveable object, even if a determined position has been determined with great accuracy (e.g., within a predefined level of precision, such as 10 cm, 5 cm, or 2 cm) with respect to a virtual global reference frame (sometimes called a global coordinate system) using precise point positioning (PPP) or other absolute mode of navigation, the determined position is typically not a "repeatable position" over a long period of time (e.g., over a period of time exceeding a predefined amount of time, such as one year), because a moveable object at the same determined position, P1, determined at the current time, and determined again a year later, will be separated in fact by a distance D corresponding to a rate of tectonic plate movement and corresponding to the amount of time between the two times at which the position was determined.

Sixteen major plates have been identified, each moving at a different velocity (speed and direction). For example, the North American plate moves about 2 cm per year, while the Australian plate moves about 8 cm per year. FIG. 2 illustrates the major tectonic plates, also herein called tectonic terrestrial plates.

In navigation systems that use a differential mode of navigation, such as real-time kinematic (RTK) based systems, base station receivers (often called base stations), located at surveyed positions, periodically broadcast satellite data to moving object receivers. Moving object receivers compare their own phase measurements with the ones received from the base station, and use that information plus the position of the base station to determine their own position. Since each base station is positioned on a single tectonic plate, and its position is known, RTK-based navigation systems automatically adjust for continental drift. However, the use of differential modes of navigation is not practical in many settings, due to either the cost of such systems, or the lack of based stations positioned sufficiently close to the position(s) of the moveable objects whose position needs to be determined with high precision in real time.

Navigation systems using absolute modes of navigation typically use standard point positioning (SPP) or precise point positioning (PPP). In absolute mode navigation systems, a moveable object's coordinates are determined with respect to a virtual global reference frame. However, if "the ground underneath" a surveyed position moves, relative to the virtual global reference frame, between the time of a first survey and a second survey, when the moveable object returns to the exact same coordinates at the time of the second survey, it will not be at the same position on the ground. It would therefore be useful to have the navigation systems of moveable objects that require long term, high precision repeatability of surveyed positions to include mechanisms for automatically adjusting for tectonic plate movements.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4B-4D illustrate examples of three multi-plate cells in the tectonic plate mapping database.

FIGS. 6A-6E are flowcharts illustrating a method for determining a corrected position, corrected for tectonic plate movement, of a moveable object, according to some embodiments.

SUMMARY

Figure 1:
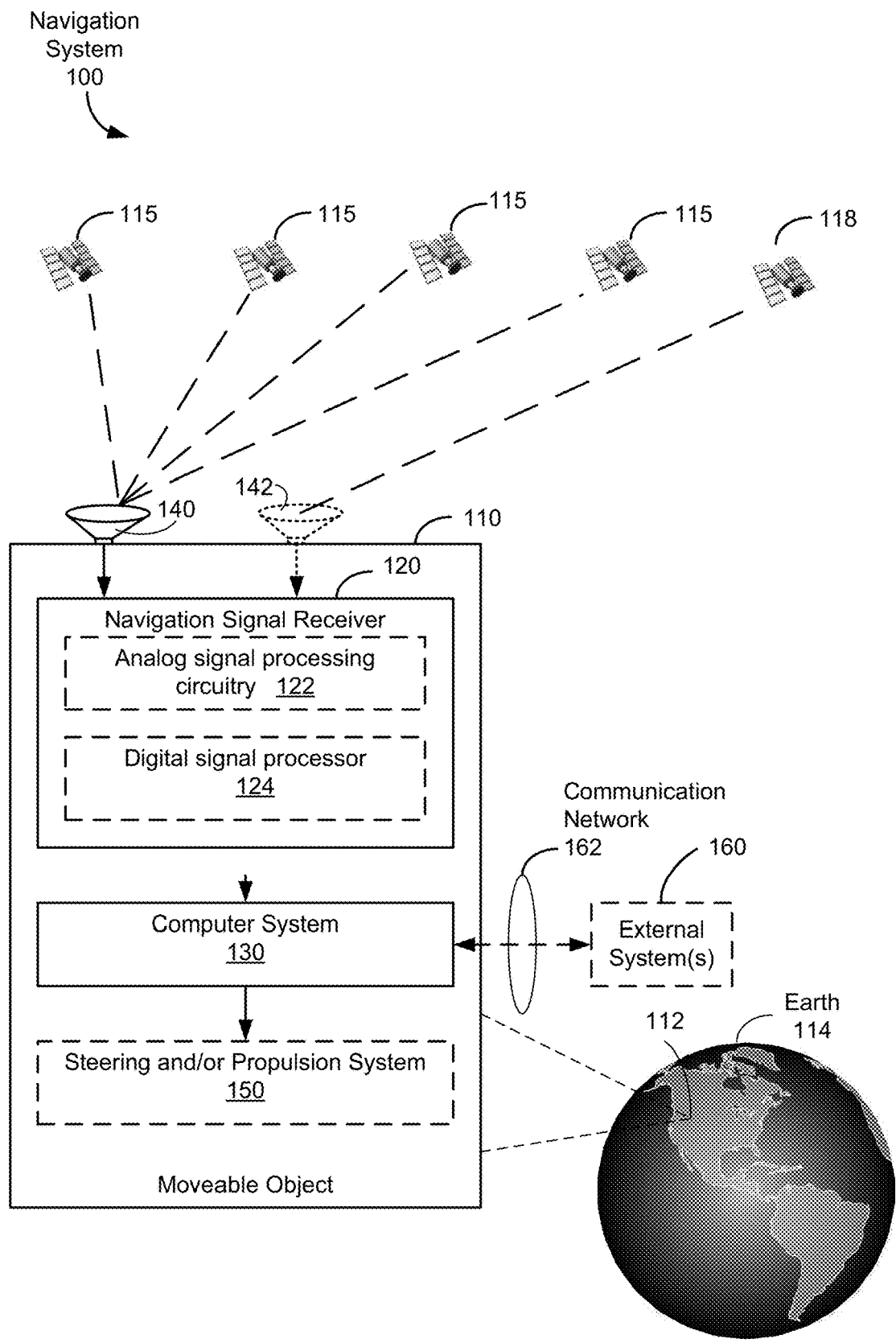
FIG. 1 is a block diagram illustrating a navigation system, according to some embodiments.

Some embodiments provide a system, computer readable storage medium storing instructions, or a method for navigating a moveable object according to signals from satellites.

(A1) In the method of navigating a moveable object, a moveable object receives satellite navigation signals from a number of satellites, and also receives satellite orbit correction information and satellite clock correction information for the plurality of satellites, and determines a preliminary position of the moveable object, using the received satellite navigation signals and the received satellite orbit correction information and satellite clock correction information for the plurality of satellites. A position correction is then determined by identifying which cell, of a predefined set of geographical cells that collectively correspond to a geographic area, corresponds to the determined preliminary position, and then obtaining from a database, pre-computed tectonic terrestrial plate position information for the identified cell. Based on the obtained pre-computed tectonic terrestrial plate position information for the identified cell, a tectonic terrestrial plate, corresponding to the determined preliminary position of the moveable object is identified. Based on the identified tectonic terrestrial plate, a position correction is determined, the position correction corresponding to the identified tectonic terrestrial plate and a reference epoch, and a corrected position of the moveable object is generated in accordance with the determined preliminary position of the moveable object and the determined position correction.

(A2) In some embodiments of the method of A1, the database is a database internally stored within a non-transitory computer readable storage medium of the moveable object.

(A3) In some embodiments of the method of A1 or A2, the predefined set of geographical cells includes a first set of the single-plate cells and a second set of the multi-plate cells. Each single-plate cell corresponds to a geographic region that falls entirely within a single respective tectonic terrestrial plate of the plurality of tectonic terrestrial plates, and, for each single-plate cell in the first set of single-plate cells, the database includes information identifying the single respective tectonic terrestrial plate. Each multi-plate cell corresponds to a geographic region having two or more sub-regions that fall within distinct tectonic terrestrial plates of the plurality of tectonic terrestrial plates, and, for each multi-plate cell in the second set of multi-plate cells, the database includes information identifying, for each sub-region of the two or more sub-regions corresponding to the multi-plate cell, a respective tectonic terrestrial plate and corresponding geographic boundaries.

(A4) In some embodiments of the method of any of A1 through A3, identifying the tectonic terrestrial plate, of the plurality of tectonic terrestrial plates, corresponding to the determined preliminary position of the moveable object includes, when the identified cell is a single-plate cell, identifying, from the obtained pre-computed tectonic terrestrial plate position information for the identified cell, the single tectonic terrestrial plate corresponding to the identified cell. The identified single tectonic terrestrial plate corresponds to the identified cell is identified as the tectonic terrestrial plate corresponding to the determined preliminary position of the moveable object. When the identified cell is a multi-plate cell, identifying the tectonic terrestrial plate includes determining which sub-region, of the two of more sub-regions corresponding to the identified cell, includes the determined preliminary position of the moveable object, and based on the determined sub-region; and identifying, from the obtained pre-computed tectonic terrestrial plate position information for the identified cell, the tectonic terrestrial plate corresponding to the determined sub-region of the two of more sub-regions corresponding to the identified cell. The identified tectonic terrestrial plate corresponding to the determined sub-region is identified as the tectonic terrestrial plate corresponding to the determined preliminary position of the moveable object.

(A5) In some embodiments of the method of A4, the database includes information identifying two or more polygons for each multi-plate cell in the second set of multi-plate cells, each polygon having an internal area corresponding to a respective sub-region of the geographic region for a respective multi-plate cell. Furthermore, determining, when the identified cell is multi-plate cell, which of the two of more sub-regions corresponding to the identified cell includes the determined preliminary position of the moveable object includes comparing the determined preliminary position with at least one polygon of the two or more polygons for the identified cell, until a determination is made as to which of the two or more polygons for the identified cell includes the determined preliminary position.

(A6) In some embodiments of the method of A5, the information identifying two or more polygons for each multi-plate cell in the second set of multi-plate cells comprises an ordered list of polygons for each multi-plate cell in the second set of multi-plate cells, and information identifying a single respective tectonic terrestrial plate, of the plurality of tectonic terrestrial plates, as corresponding to each polygon.

(A7) In some embodiments of the method of A6, the identified cell is a multi-plate cell, the method includes identifying the tectonic terrestrial plate, of the plurality of tectonic terrestrial plates, corresponding to the determined preliminary position of the moveable object by comparing the determined preliminary position with one or more polygons for the identified cell in an order specified by the ordered list of polygons for the identified cell.

(A8) In some embodiments of the method of A6 or A7, the information in the internal database for each multi-plate cell in the second set of multi-plate cells includes a number of polygons for the multi-plate cell, and further includes a number, comprising a positive integer greater than one, corresponding to the number of polygons identified by the database for the multi-plate cell. In such embodiments, when the identified cell is a multi-plate cell, the method includes determining the number, N, of polygons identified by information in the database for the identified cell, and identifying the tectonic terrestrial plate, of the plurality of tectonic terrestrial plates, corresponding to the determined preliminary position of the moveable object by comparing the determined preliminary position with no more than N−1 of the polygons for the identified cell.

(A9) In some embodiments of the method of any of A1 through A8, the method includes generating, from the satellite navigation signals received from the plurality of satellites, and the satellite orbit correction information and satellite clock correction information for the plurality of satellites, satellite navigation data for the moveable object, the satellite navigation data for the moving object including code measurements and carrier phase measurements each satellite of the plurality of satellites; and determining the position of the moveable object from the code measurements and carrier phase measurements of the plurality of satellites.

(A10) In some embodiments of the method of any of A1 through A9, the predefined set of geographical cells includes more than 15,000 distinct cells corresponding to distinct geographic regions of the geographic area, each distinct cell of the predefined set of geographical cells corresponds to a range of latitudes that does not exceed two degrees, and each distinct cell of the predefined set of geographical cells, other than cells corresponding to geographic regions that overlap the North and South poles of Earth, further corresponds to a range of longitudes that does not exceed two degrees.

(A11) In another aspect, in some embodiments, a moveable object includes one or more hardware processors; at least one receiver for receiving satellite navigation signals from a plurality of satellites, and satellite orbit correction information and satellite clock correction information;

memory storing one or more programs, and further storing a database have pre-computed tectonic terrestrial plate position information for each cell of a predefined set of geographical cells, which collectively correspond to a geographic area that includes a plurality of tectonic terrestrial plates, each cell of the predefined set of geographical cells corresponding to a geographic region; and a housing that encloses at least the one or more hardware processors and memory. The one or more programs, when executed by the one or more processors, cause the moveable object to: perform the method of any of A1 to A10.

(A12) In another aspect, in some embodiments, a non-transitory computer readable storage medium stores one or more programs for execution by one or more processors of a moveable object. The one or more programs including instructions that when executed by the one or more processors of the moveable object cause the moveable object to perform the method of any of A1 to A10.

(A13) In another aspect, in some embodiments, a computer system includes one or more hardware processors; at least one transceiver for communication with a moveable object; and memory storing one or more programs, and further storing a database have pre-computed tectonic terrestrial plate position information for each cell of a predefined set of geographical cells, which collectively correspond to a geographic area that includes a plurality of tectonic terrestrial plates, each cell of the predefined set of geographical cells corresponding to a geographic region. The one or more programs, when executed by the one or more processors, cause the computer system to determine a preliminary position of the moveable object, using information received from the moveable object via the at least one transceiver; and, in accordance with the determined preliminary position, identify a cell of a predefined set of geographical cells, which collectively correspond to a geographic area that includes a plurality of tectonic terrestrial plates, the identified cell corresponding to a geographic region that includes the determined preliminary position, wherein the identified cell is identified by applying a predefined mathematical function to the determined preliminary position, and the predefined set of geographical cells includes more single-plate cells, which each correspond to a geographic region that falls within a single respective tectonic terrestrial plate of the plurality of tectonic terrestrial plates, than multi-plate cells, which each correspond to a geographic region having two or more sub-regions that fall within distinct tectonic terrestrial plates of the plurality of tectonic terrestrial plates. The one or more programs, when executed by the one or more processors, further cause the computer system to obtain, from a database established prior to determination of the preliminary position of the moveable object, pre-computed tectonic terrestrial plate position information for the identified cell, the database including tectonic plate information for each cell of the predefined set of geographical cells; based on the obtained pre-computed tectonic terrestrial plate position information for the identified cell, identify a tectonic terrestrial plate, of the plurality of tectonic terrestrial plates, corresponding to the determined preliminary position of the moveable object; based on the identified tectonic terrestrial plate, determine a position correction, the position correction corresponding to the identified tectonic terrestrial plate and a reference epoch; and generate a corrected position of the moveable object in accordance with the determined preliminary position of the moveable object and the determined position correction.

DESCRIPTION OF EMBODIMENTS

FIG. 1 is a block diagram illustrating a navigation system 100, according to some embodiments. Navigation system 100 enables a moveable object 110 (e.g., a boat, a truck or other vehicle, a farming appliance, mining appliance, drilling system, etc.) to determine, at any point of time, its current position 112 with respect to a global coordinate system (e.g., a coordinate system for Earth 114). Moveable object 110 is equipped with a satellite receiver (navigation signal receiver 120), typically including or coupled to one or more satellite antennas 140, to receive satellite navigation signals from at least four satellites 115 that are orbiting Earth. The satellite navigation signals received by moveable object 110 are typically global navigation satellite system (GNSS) signals, such as Global Positioning System (GPS) signals at the 1575.42 MHz L1 signal frequency and the 1227.6 MHz L2 signal frequency.

Moveable object 110 also receives satellite orbit correction information and satellite clock correction information (sometimes collectively called "correction information") for the plurality of satellites. The correction information is typically broadcast by and received from one or more satellites 118 distinct from the GNSS satellites 115, using an antenna 142 and signal receiver 152 (see FIG. 3) distinct from antenna 140 and receiver 120 used to receive the satellite navigation signals. However, in some embodiments, the same antenna and receiver are used to receive both satellite navigation signals and correction information.

Moveable object 110 determines a preliminary position of moveable object 110, using the received satellite navigation signals and the received satellite orbit correction information and satellite clock correction information for the plurality of satellites. In some embodiments, received satellite navigation signals are processed by navigation signal receiver 120, including analog signal processing circuitry 122 and a digital signal processor 124, taking into account the correction information, to determine code measurements and phase measurements for signals received from four or more satellites 115. Embedded computer system 130 determines the preliminary position of moveable object 110 based on those measurements.

In some embodiments, the positioning methodology used by moveable object to determine the preliminary position is precise point positioning (PPP), or more generally absolute positioning, as opposed to differential positioning in which positions are determined relative to one or more local base stations. It is noted that the embodiments described herein are not dependent on the exact methodology used to determine the preliminary position of the moveable object, so long as the accuracy of the preliminary position is within a predefined level of accuracy (e.g., 10 cm, 5 cm or 2 cm), and so long as the preliminary position is not already compensated for tectonic terrestrial plate movement.

Optionally, the preliminary position of moveable object 110, or a corrected position that has been generated in accordance with the determined preliminary position and a determined position correction, is conveyed to one or more external systems 160 via communication network 162.

Optionally, moveable object 110 is configured to control movement of moveable object 110 (e.g., by controlling steering and/or propulsion system 150 of moveable object 110) in accordance with a planned route, and/or in accordance with previously surveyed positions, and/or in accordance with mechanical or electronic controls operated by a human operator.

Figure 2:
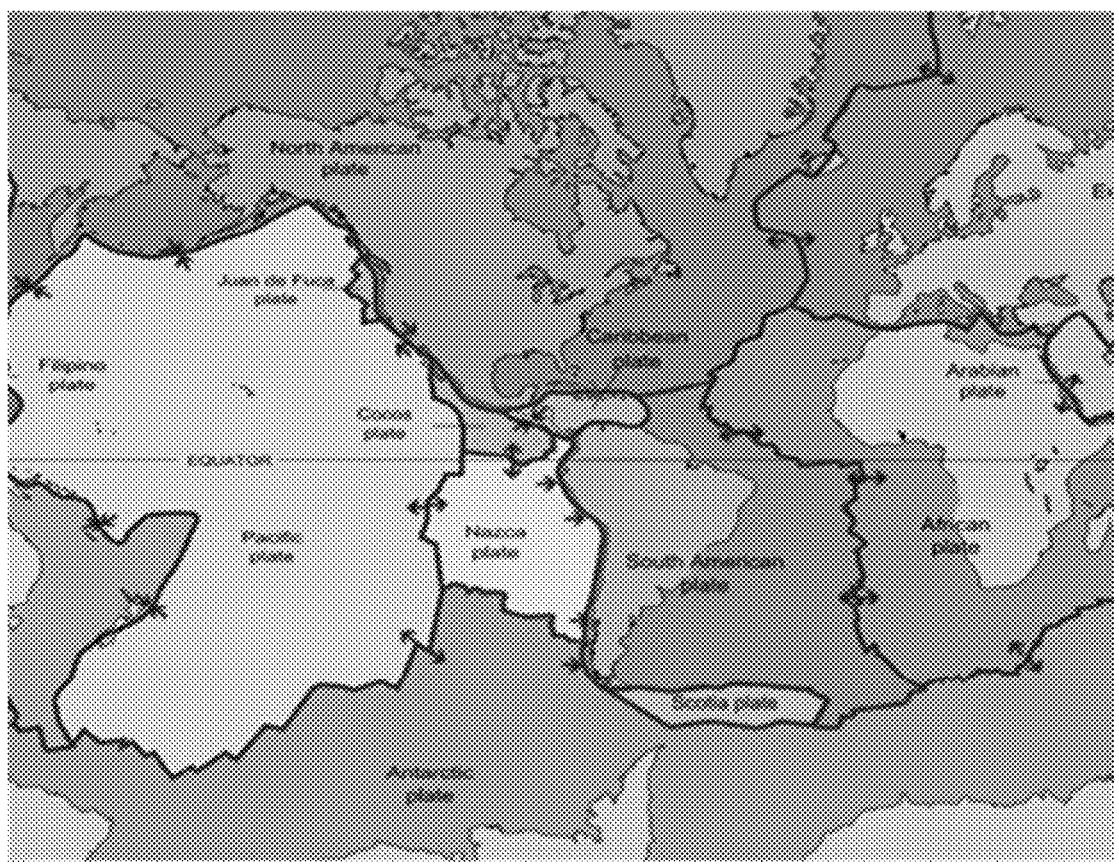
FIG. 2 illustrates the major tectonic plates.

FIG. 2 illustrates a map showing the 16 major tectonic plates on Earth, and includes a listing of those tectonic plates. As can be seen, the boundaries of the tectonic plates are complex. As a result, determining the tectonic plate corresponding to any particular position may require a significant number of computations using conventional ray casting (e.g., ray casting for sphere surface) to determine whether the particular position is within the boundary of any particular tectonic plate. The embodiments discussed below significantly reduce both the average amount of processing time, and the maximum (or worst case) processing time required to determine the tectonic plate corresponding to any particular position.

Figure 3:
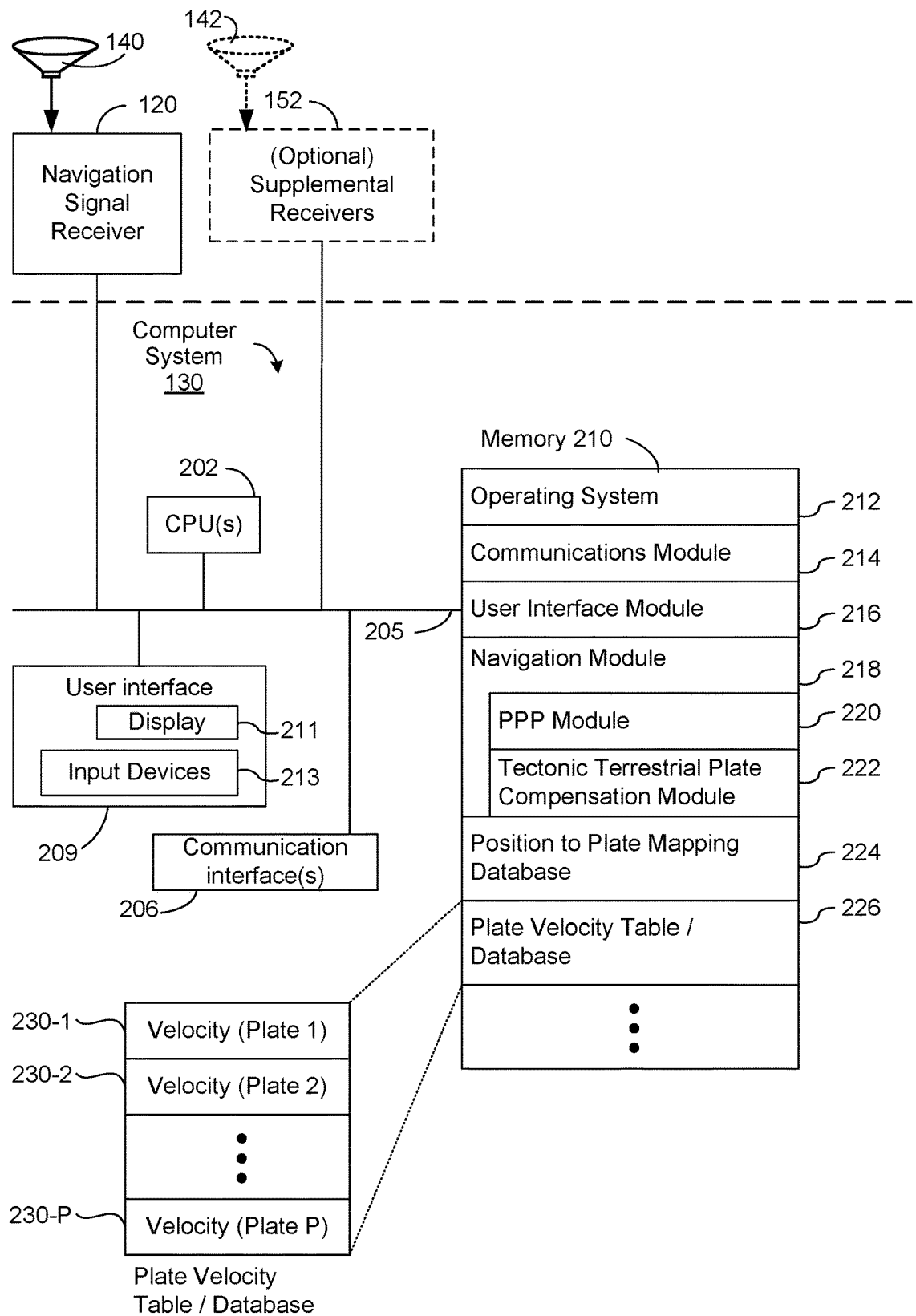
FIG. 3 is a block diagram of a computer system, such as a computer system that is part of a moveable object's navigation system, according to some embodiments.

FIG. 3 is block diagram of computer system 130 in, and used by, a moveable object's to determine the position of the moveable object, according to some embodiments, Computer system 130 typically includes one or more processors (sometimes called CPU's, hardware processors) 202 for executing programs or instructions; memory 210; one or more communications interfaces 206; and one or more communication buses 205 for interconnecting these components. Computer system 130 optionally includes a user interface 209 comprising a display device 211 and one or more input devices 213 (e.g., one or more of a keyboard, mouse, touch screen, keypad, etc.) coupled to other components of computer system 130 by the one or more communication buses 205. Navigation signal receiver 120, and supplemental receiver(s) 152, if provided, are also coupled to other components of computer system 130 by the one or more communication buses 205. The one or more communication buses 205 may include circuitry (sometimes called a chipset) that interconnects and controls communications between system components.

Communication interface 206 (e.g., a receiver or transceiver) is used by computer system 130, and more generally moveable object 110, to convey information to external systems, and to receive communications from external systems.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a computer readable storage medium. In some embodiments, memory 210 or the computer readable storage medium of memory 210 stores the following programs, modules and data structures, or a subset thereof:

- an operating system 212 that includes procedures for handling various basic system services and for performing hardware dependent tasks.
- a communications module 214 that operates in conjunction with communication interface 206 (e.g., a receiver and/or transceiver) to handle communications between moveable object 110 and external systems 160.
- a user interface module 216 for receiving information from one or more input device 213 of user interface database 209, and to convey information to a user of moveable object 110 via one or more display or output devices 211.
- a navigation module 218 for determining a position of the moveable object, including, in some embodiments, a precise point positioning (PPP) module 220 for determining a preliminary position of moveable object 110, and a tectonic terrestrial plate compensation module 222 for determining a position correction for moveable object 110;
- a position to plate mapping database 224, having information to facilitate fast determinations of the tectonic terrestrial plate corresponding to any given position, as describe in more detail below with reference to FIGS. 4A-4D; and
- a plate velocity table or database 226, which includes velocity information for each of the tectonic terrestrial plates, and which is used, once the tectonic terrestrial plate corresponding to the moveable object's preliminary position is known, to determine a position correction.

Operating system 212 and each of the above identified modules and applications correspond to a set of instructions for performing a function described above. The set of instructions can be executed by the one or more processors 202 of computer system 130. The above identified modules, applications or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 optionally stores additional modules and data structures not described above.

FIG. 3 is intended more as functional description of the various features which may be present in a computer system 130 of a moveable object 110 than as a structural schematic of the embodiments described herein. In practice, and as recognized by those of ordinary skill in the art, items shown separately could be combined and some items could be separated. For example, some items shown separately in FIG. 3 could be combined into a single module or component, and single items could be implemented using two or more modules or components. The actual number of modules and components, and how features are allocated among them will vary from one implementation to another.

Figure 4A:
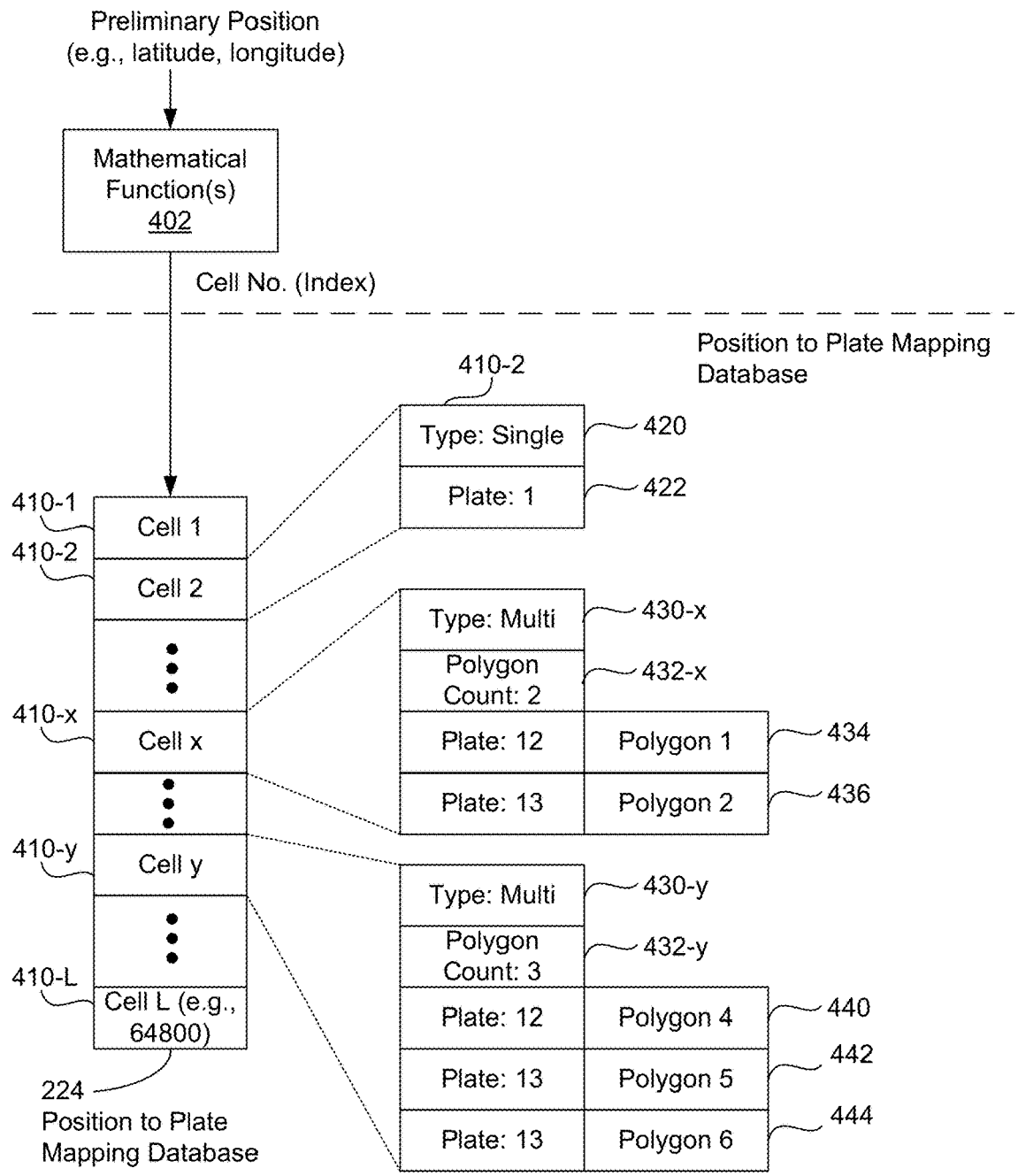
FIG. 4A is block diagram illustrating a data structure of a position to tectonic plate mapping database, used to efficiently map the determined position of a moveable object to the tectonic plate on which that determined position is located, according to some embodiments.

FIG. 4A is block diagram illustrating position to tectonic plate mapping database 224, in accordance with some embodiments. As shown in FIG. 4A, position to tectonic plate mapping database 224 includes entries 410-1 to 410-L, corresponding to L distinct cells in a predefined set of geographical cells, which collectively correspond to a geographic area that includes a plurality of tectonic terrestrial plates. In some embodiments, each entry 410 includes information identifying one or more tectonic terrestrial plates for the geographic cell corresponding to the database entry 410.

In some embodiments, the entry 410 corresponding to a specified position is determined by applying a mathematical function 402 to the specified position to produce an index corresponding to the entry. For example, if the position is specified as a latitude and longitude, in some embodiments the mathematical function (A) converts the latitude to a value between 0 and 180, inclusive, and the longitude to a value between 0 and 360, inclusive; (B) takes the integer portion of the resulting latitude and longitude to produce a clipped latitude and longitude, and if clipped latitude is 180 replaces it with 179 and if the clipped longitude is equal to 360, replaces it with 359; and (C) computes an index equal to 1+latitude+(longitude*180)

where the latitude and longitude used in part (C) of the mathematical function are the clipped latitude and clipped longitude. In some other embodiments, the index is computed in part (C) of the mathematical function as being equal to 1+longitude+(latitude*360).

In yet other embodiments, other mathematical functions are applied to the specified position to determine the index corresponding to the specified position.

In some embodiments, the predefined set of geographical cells includes a first set of the single-plate cells and a second set of multi-plate cells, and database 224 includes entries for both the first set of the single-plate cells and the second set of multi-plate cells. Each single-plate cell corresponds to a geographic region that falls entirely within a single respective tectonic terrestrial plate of the plurality of tectonic terrestrial plates. For each single-plate cell in the first set of single-plate cells, the database has an entry 410 that includes information identifying the single respective tectonic terrestrial plate. For example, in FIG. 4A, entry 410-2 has fields for storing information, for cell 2, that includes a single tectonic terrestrial plate identifier (422) (e.g., an identifier for plate 1), and in some embodiments includes a cell type value (420) indicating that the cell is a single-plate cell.

In some embodiments, each multi-plate cell corresponds to a geographic region having two or more sub-regions that fall within distinct tectonic terrestrial plates of the plurality of tectonic terrestrial plates. For each multi-plate cell in the second set of multi-plate cells, the database includes an entry 410 identifying, for each sub-region of the two or more sub-regions corresponding to the multi-plate cell, a respective tectonic terrestrial plate and corresponding geographic boundaries. (For ease of explanation, cells and their corresponding geographic region will sometimes be treated as being the same thing, while in fact the cells are constructs, each having a corresponding geographic region. Similarly, for ease of explanation, "sub-regions of cells" (e.g., a "sub-region of cell x") will sometimes be mentioned, but each such sub-region will be understood to be a sub-region of the geographic region corresponding to the cell.)

Referring to FIG. 4A, entry 410-x has fields for storing information, for cell x, a cell type value (430-x) that identifies cell x as a multi-plate cell, and a sub-region count value (432-x) that identifies the number of sub-regions (e.g., 2 sub-regions in this example) of cell x for which boundary information and a tectonic terrestrial plate identifier are stored. Entry 410-x furthermore includes fields 434 and 436, each of which identifies (A) a polygon specifying the boundaries of a respective sub-region of the geographic region corresponding to cell x, and (B) the tectonic terrestrial plate corresponding to that sub-region.

Similarly, in FIG. 4A, entry 410-y has fields 430-y, 432-y, for storing information, for cell y, that identifies cell y as a multi-plate cell, and identifies the number of sub-regions (e.g., 3 sub-regions in this example) of cell y that fall within distinct tectonic terrestrial plates of the plurality of tectonic terrestrial plates. Entry 410-y furthermore includes fields 440, 442 and 444, each of which identifies a polygon specifying the boundaries of a respective sub-region of the geographic region corresponding to cell y.

In some embodiments, database 224 includes a set of entries 410 that collectively correspond to a geographic area, such as the entire surface of Earth, or North America, or the continental United States. In some embodiments, database 224 includes over 1000 distinct cells 410 corresponding to distinct geographic regions of the geographic area. In some embodiments, database 224 includes over 15,000 distinct cells 410 corresponding to distinct geographic regions of the geographic area. In some embodiments, database 224 includes over 50,000 distinct cells 410 corresponding to distinct geographic regions of the geographic area. Furthermore, in some embodiments, database 224 includes more single-plate cells, which each correspond to a geographic region that falls within a single respective tectonic terrestrial plate of the plurality of tectonic terrestrial plates, than multi-plate cells, which each correspond to a geographic region having two or more sub-regions that fall within distinct tectonic terrestrial plates of the plurality of tectonic terrestrial plates.

In some embodiments, database 224 includes 64,800 entries 410 that collectively correspond to the entire surface of Earth, with each entry 410 corresponding to a cell, which in turn corresponds to a geographic region having a 1° range of latitudes and a 1° range of longitudes. Stated another way, the surface of Earth is divided into cells, each corresponding to a geographic region having a 1° range of latitudes and a 1° range of longitudes. As a result, there are 64,800 cells (i.e., 180×360 cells), and 64,800 corresponding entries 410. In some embodiments, only 3276 out of the 64,800 entries in database 224 correspond to multi-plate cells, and the other 61,524 entries of database 224 are single-plate cells. Stated another way, over 94% of the database entries correspond to single-plate cells, and thus for positions located on the over 94% of Earth's surface corresponding to the single-plate cells, no ray casting (e.g., no ray casting for sphere surface or planar surface) computations or the like are required to determine the tectonic terrestrial plate corresponding to those positions.

In some embodiments, a number of cells corresponding to the polar caps (e.g., all cells for the geographic region that falls within 2° of each polar cap are collapsed or merged into a single cell, thereby reducing the number of cells. It is noted that each of the polar caps corresponds to a single tectonic terrestrial plate. However, since the amount of storage required for single-plate cells is small, and a primary goal of the embodiments disclosed herein is to reduce computation time for determining the tectonic terrestrial plate corresponding to a determined preliminary position, in many embodiments, cells corresponding to the polar caps are not collapsed or merged.

FIGS. 4B-4D illustrate examples of three multi-plate cells in the tectonic plate mapping database. FIG. 4B shows an example of the geographic region corresponding to a cell that has two sub-regions, including one sub-region that falls within plate 2 and another sub-region that falls within plate 1. For this cell, database 224 (FIG. 4A) would include an entry 410 similar to entry 410-x, with information indicating that the cell is a multi-plate cell, has two sub-regions, and including one field (e.g., field 434) with information identifying a polygon corresponding to the boundaries of the sub-region in plate 2 and another field (e.g., field 436) with information identifying a polygon corresponding to the boundaries of the sub-region in plate 1.

FIG. 4C shows an example of the geographic region corresponding to a cell that has three sub-regions, including one sub-region that falls within plate 1, a second sub-region that falls within plate 2, and a third sub-region that falls within plate 3. For this cell, database 224 (FIG. 4A) would include an entry 410 similar to entry 410-y, with information indicating that the cell is a multi-plate cell, has three sub-regions, and including three fields (e.g., fields 440, 442, 444), each with information identifying a polygon corresponding to the boundaries of a respective sub-region of the three sub-regions of the cell, and a plate identifier that identifies the plate in which the respective sub-region falls.

FIG. 4D shows an example of the geographic region corresponding to a cell that has three sub-regions, including one sub-region that falls within plate 1, a second sub-region that falls within plate 2, and a third sub-region that falls within plate 1. Thus, two of the sub-regions of the cell correspond to the same plate. Stated another way, this cell overlaps with two plates, but three sub-regions are needed to specify the portions of the cell that overlap with the two plates. For this cell, database 224 (FIG. 4A) would include an entry 410 similar to entry 410-*y*, with information indicating that the cell is a multi-plate cell, has three sub-regions, and including three fields (e.g., fields 440, 442, 444), each with information identifying a polygon corresponding to the boundaries of a respective sub-region of the three sub-regions of the cell, and a plate identifier that identifies the plate in which the respective sub-region falls.

Figure 5A:
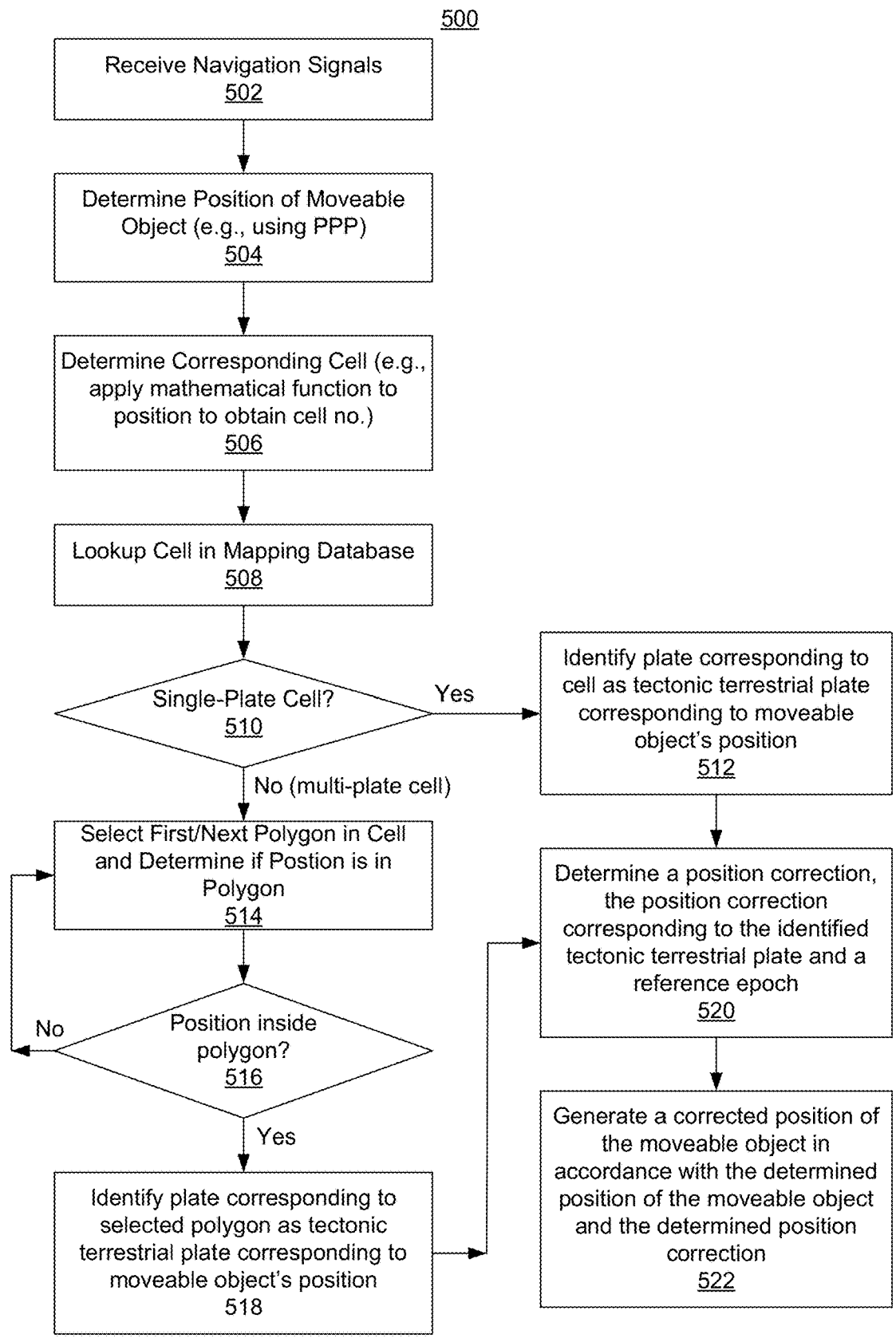
FIG. 5A is a conceptual flowchart of a process for determining a corrected position, corrected for tectonic plate movement, of a moveable object, according to some embodiments.

FIG. 5A is a conceptual flowchart of a process 500 (also herein called method 500) for determining a corrected position, corrected for tectonic plate movement, of a moveable object, according to some embodiments. Process 500 is typically performed by a signal receiver (e.g., receiver 120, FIG. 1) and computer system (e.g., system 130, FIG. 1) at or embedded in the moveable object, but optionally is performed, at least in part, by a system (e.g., system 160, FIG. 1) external to or remote from the moveable object. For ease of explanation, process 500 will be explained as being performed by the moveable object, but it will be understood that at least some portions of process 500 could be performed by an external system.

The moveable object receives navigation signals (502), for example GNSS signals from four or more GNSS satellites (e.g., satellites 115, FIG. 1). Using the received navigation signals, the moveable object determines (504) a preliminary position of the moveable object. Typically, the determination of the preliminary position also used satellite orbit correction information and satellite clock correction information for four or more satellites. As explained above with reference to FIG. 1, the correction information is typically received from one or more satellites 118 distinct from the GNSS satellites 115. Furthermore, the preliminary position is typically determined using an absolute mode of navigation, such as standard point positioning (SPP) or precise point positioning (PPP). Since SPP and PPP are well known navigation techniques, and since the embodiments disclosed herein concern position corrections determined after the preliminary position of the moveable object has been determined, no further discussion of SPP or PPP is included herein.

Next, after the preliminary position has been determined, a cell corresponding to the preliminary position is determined (506), for example by applying a mathematical function to the preliminary position to obtain a cell number or database index. Examples of such mathematical functions are described above with reference to FIG. 4.

Using the determined cell (e.g., cell number or database index), a database lookup for the cell is performed (508) to obtain information corresponding to the cell. For example, an entry 410 (FIG. 4) in a mapping database 400 is obtained or accessed using the determined cell. Using the obtained or accessed database entry, a determination is made (410) whether the determined cell is a single-plate cell. The "determined cell" is sometimes herein called the "identified cell."

If the determined cell (corresponding to the preliminary position) is a single-plate cell (510-Yes), the process identifies the tectonic plate corresponding to the determined cell (and thus corresponding to the preliminary position) as the plate identified by the database entry for the determined cell. For example, as shown in FIG. 4, if the determined cell is cell 2, the plate corresponding to the preliminary position is the obtained from the field (e.g., field 422) of the database entry 410-2 that identifies the single tectonic plate corresponding to cell 2.

If the determined cell (corresponding to the preliminary position) is not a single-plate cell (510-no), which means that the determined cell is a multi-plate cell, a sequence of operations (514, 516, 518) are performed until the sub-region of the cell corresponding to (e.g., that encompasses) the preliminary position is identified, and then the tectonic plate corresponding to that sub-region is identified (518) from the database entry for the determined cell (accessed during operation 508).

More specifically, as discussed above with reference to FIG. 4, the database entry for the determined cell includes a sequence of polygons corresponding to sub-regions of the cell. A first polygon in the sequence of polygons listed in the database entry is selected, and a determination is made (514) whether the preliminary position falls within that polygon. In some embodiments, the determination is made using any of a number of well-known techniques, one of which is known as ray casting (for planar surface). Since these methods of determining whether a point is located within a polygon are well known, they are not further described here. If the preliminary position is not inside the selected polygon (516-No), a next polygon in the sequence of polygons is selected (514) and a determination is made (514) whether the preliminary position falls within that polygon. Operations 514 and 516 are repeated until it is determined which polygon, and thus which sub-region of the cell, the preliminary position falls within. Once the polygon or sub-region of the identified cell that encompasses the preliminary position has been identified, the plate corresponding to that polygon or sub-region is identified (518) from the information in the database entry for the identified cell.

In some embodiments, an optimization of the sub-process (514, 516) for identifying the polygon or sub-region of the cell that encompasses the preliminary position is utilized. In such embodiments, determinations are made regarding no more than N−1 of the N polygons in the determined cell. In particular, if the preliminary position is found, via N−1 iterations of operations 514 and 516, not to fall within the first N−1 of the N polygons (or more generally, any N−1 of the N polygons) listed in the database entry, the process automatically determines that the preliminary position falls within the last polygon (or more generally, the remaining polygon) listed in the database entry, without performing the mathematical function to check that the preliminary position falls within that polygon. Furthermore, the tectonic plate corresponding to the preliminary position is identified as the tectonic plate corresponding to the remaining polygon listed in the database entry for the determined cell. This optimization is possible because the N polygons listed in the database entry collectively encompass or correspond to the entire geographical region corresponding to the determined cell. In summary, in embodiments using this optimization, process 500 includes determining the number, N, of polygons identified by information in the database for the identified cell, and identifying the tectonic terrestrial plate, of the plurality of tectonic terrestrial plates, corresponding to the determined preliminary position of the moveable object by comparing the determined preliminary position with no more than N−1 of the polygons for the identified cell.

Once the tectonic plate corresponding to preliminary position (e.g., the geographic region of which that encompasses the preliminary position) has been identified, by operation 512 or 518, a position correction is determined (520), based on the identified tectonic plate and a reference epoch. In some embodiments, the reference epoch is a predefined point in time, such as Jan. 1, 2020, at 12:00 AM (i.e., the beginning of the day on Jan. 1, 2020). It is noted that the reference epoch can be virtually any predefined point in time, and is not limited to the example provided in the prior sentence, but that once it is selected, it will typically remain unchanged.

In some embodiments, the moveable device includes a plate velocity table or database 226 (FIG. 3), which includes an angular velocity, or more specifically a rotation rate vector, for each plate. For example, in some implementations, table 226 includes, for each tectonic plate, a Cartesian rotation vector $\vec{\Omega}$ having X, Y and Z components (e.g., $\vec{\Omega}=[\Omega_x, \Omega_y, \Omega_z]$). Each component is a parameter expressed in units such as radians/unit-of time (e.g., radians per million years). For any given position within a tectonic plate, a linear velocity $\vec{v}$ is obtained by multiplying the Cartesian rotation vector $\vec{\Omega}$ by the preliminary position expressed as a vector, $\vec{r}_0$. For example $$\vec{v}=\vec{\Omega}\times\vec{r}_0. \quad \text{(Equation 1)}$$

The position correction is then computed as a displacement $\vec{d}$ from the preliminary position, $\vec{r}_0$, using the linear velocity and the amount of time between the current time, $t_0$, (i.e., the time at which the moveable device was at the preliminary position) and the reference epoch, $t_R$. For example, the position correction is computed as:

$$\vec{d}=\vec{v}\cdot(t_R-t_0). \quad \text{(Equation 2)}$$

The corrected position, $\vec{r}$, corrected for tectonic plate movement and referenced to the reference epoch, is then generated (522) by adding the position correction, $\vec{d}$, to the preliminary position, $\vec{r}_0$. For example:

$$\vec{r}=\vec{r}_0+\vec{d}. \quad \text{(Equation 3)}$$

Alternatively, and equivalently, operations 520 and 522 are combined by generating the corrected position, $\vec{r}$, as follows:

$$\vec{r}=\vec{r}_0+\vec{v}\cdot(t_R-t_0) \quad \text{(Equation 4)}$$

where $\vec{r}_0$ is the preliminary position of the moveable object, $t_0$ is the time at which the moveable device was at the preliminary position, $t_R$ is the reference epoch, and $\vec{v}$ is the linear velocity of the identified tectonic plate at the preliminary position of the moveable object.

Figure 5B:
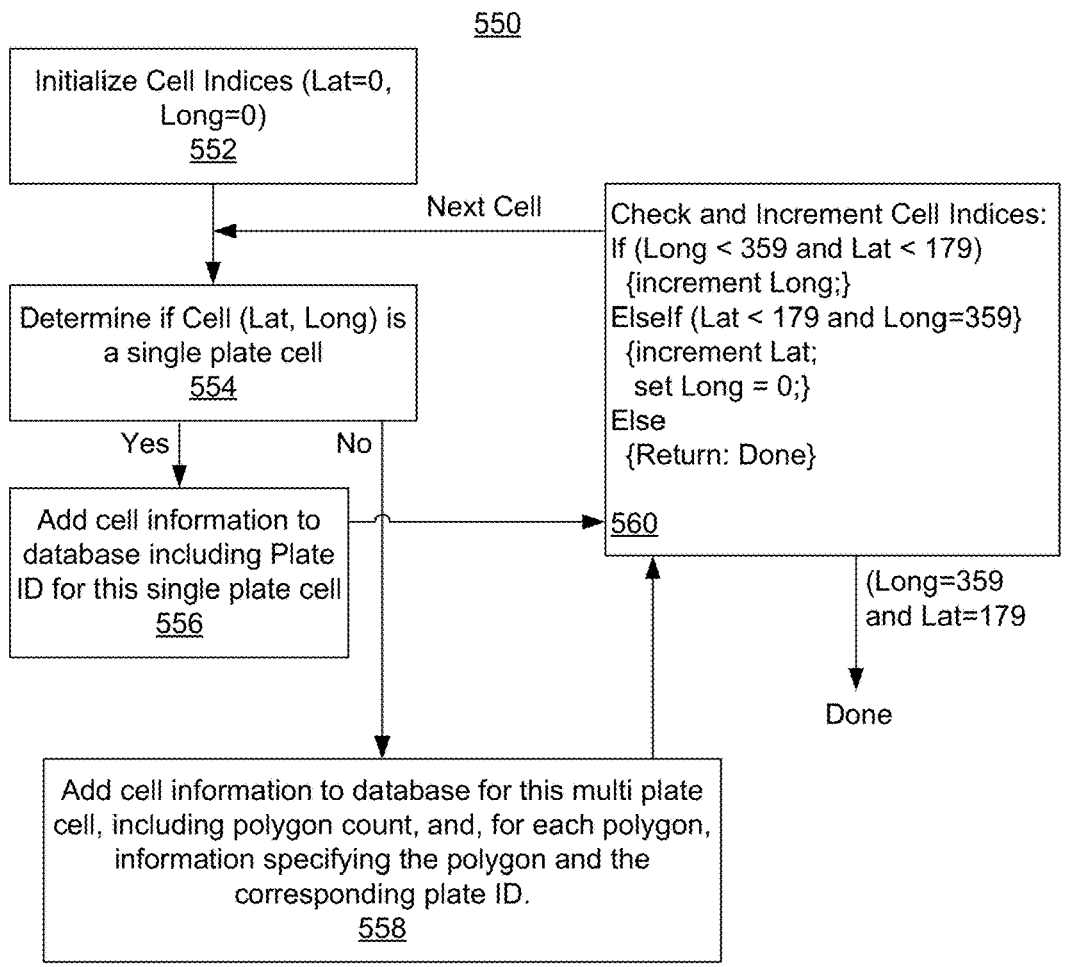
FIG. 5B is a conceptual flowchart of a process for generating a position to plate mapping database, such as the position to plate mapping database 224 shown in FIG. 4, according to some embodiments.
Figure 6A:
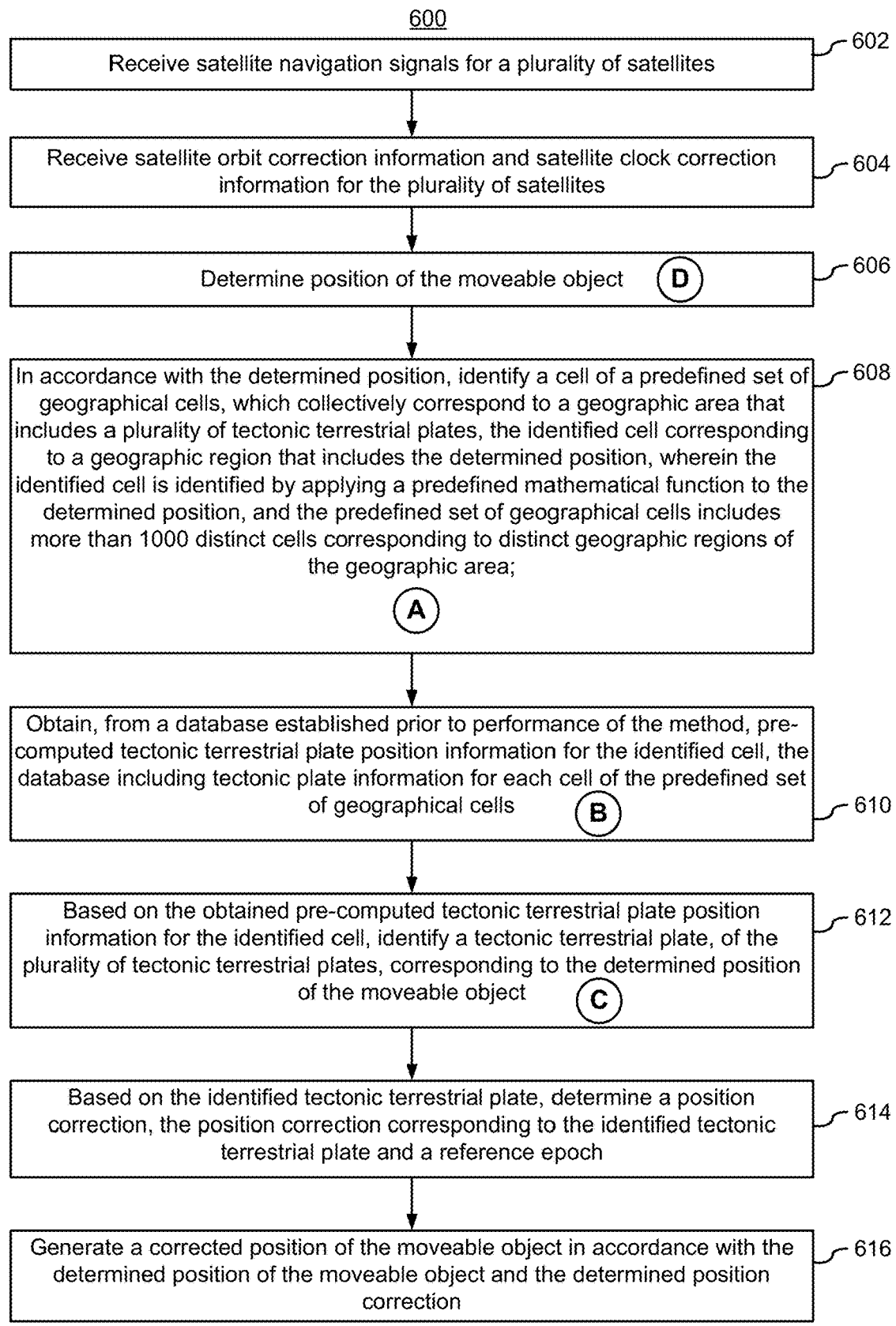

FIG. 5B is a conceptual flowchart of a process 550 for generating a position to plate mapping database, such as the position to plate mapping database 224 shown in FIG. 4, according to some embodiments. Starting (552) at a first cell, having a starting point latitude and longitude (e.g., 0, 0) and a corresponding cell or database index, operations 554-560 of process 550 repeat until cell information for all cells covering a predefined geographic region (e.g., a continent, nation, or the entire Earth) have been added to the database. For each cell, a determination is made whether the cell currently being processed (sometimes called the current cell) is a single-plate cell (554). If so (554-Yes), cell information, including a plate identifier for the tectonic plate corresponding to the cell is added to the database. In some embodiments, the cell information includes a flag or other identifier that indicates that the current cell is a single-plate cell.

If not (554-No), the current cell is a multi-plate cell, and the cell information added (558) to the database for the current cell includes a polygon count, indicating the number of sub-regions in the cell, and for each polygon (or, equivalently, sub-region) of the cell, information specifying the polygon (e.g., specifying the polygon's vertices in a predefined order (e.g., in clockwise or counter-clockwise order) and a plate identifier for the tectonic plate corresponding to the polygon. In some embodiments, the cell information includes a flag or other identifier that indicates that the current cell is a multi-plate cell.

Next, a check is performed to see if information for all cells covering the predefined geographic region has been added to the database (560-Done). If not, the cell index for the next cell to be processed is determined (560), and then information for that cell is added to the database (554, 556, 558), as described above.

For purposes of illustration and ease of explanation, the mathematical expressions in FIG. 5B (particularly for operations 552 and 560) assume that each cell corresponds to a geographic region having a 1° range of latitudes and a 1° range of longitudes, that the cells in the database corresponding to the entire surface of the Earth, and that the starting latitudes of the cells (i.e., the numerical value assigned to the lowest latitude of each cell) have been normalized so as to run from 0° to 179°, and the starting longitudes of the cells (i.e., the numerical value assigned to the lowest longitude of each cell) have been normalized so as to run from 0° to 359°. As will be well understood by those skilled in the art, embodiments of method 550 that use different sized cells, or cells whose boundaries are represented by numerical values in accordance with a different scheme, will have correspondingly different mathematical expressions for determining the cell number or index for each next cell to be processed and added to the database.

FIGS. 6A-6E are flowcharts illustrating a method 600 for determining a corrected position, corrected for tectonic plate movement, of a moveable object, according to some embodiments. Method 600 is typically performed by a moveable object having circuitry, such as a signal receiver (e.g., receiver 120, FIG. 1) and one or more processors (e.g., one or more processors of computer system 130, FIG. 1), but optionally is performed, at least in part, by a system (e.g., system 160, FIG. 1) external to or remote from the moveable object. For ease of explanation, method 600 will be explained as being performed by the moveable object, but it will be understood that at least some portions of method 600 could be performed by an external system.

As described above with reference to operations 502 and 504 of FIG. 5A, a moveable object receives (602) navigation signals for a plurality of satellites. For example, the moveable object receives GNSS signals from four or more GNSS satellites (e.g., satellites 115, FIG. 1). Furthermore, the moveable object receives (604) satellite orbit correction information and satellite clock correction information for the plurality of satellites. For example, the moveable object receives correction information that enables computation of a position (herein called the preliminary position) of the moveable object using an absolute mode of navigation, such as standard point positioning (SPP) or precise point positioning (PPP). Having received the aforementioned signals and correction information, the moveable object determines (606) a preliminary position of the moveable object. The preliminary position is typically determined with respect to a predefined global coordinate system. For purposes of explaining the embodiments described herein, it is assumed that the predefined global coordinate system is the latitude and longitude coordinate system.

As described above with reference to operation 504 of method 500 (FIG. 5), in some embodiments, the moveable object typically determines (606) a preliminary position of the moveable object using an absolute mode of navigation, such as standard point positioning (SPP) or precise point positioning (PPP).

As discussed above, even if the determined preliminary position has been determined with great accuracy (e.g., within a predefined level of precision, such as 10 cm, 5 cm, or 2 cm) with respect to a virtual global reference frame (also sometimes called global coordinate system), the preliminary position is not a "repeatable position" over a long period of time (e.g., over a period of time exceeding a predefined amount of time, such as one year), because the same preliminary position, P1, determined at the current time, and determined again a year later, will be separated in fact by a distance D corresponding to a rate of tectonic plate movement and corresponding to the amount of time between the two times at which the same preliminary position was determined. For a wide variety of agricultural, mining, geological, research and commercial applications, repeatable positions that are repeatable over long periods of time are needed. To address this problem, but adjusting the determined preliminary position and determining a long-term repeatable position, the following additional operations are performed.

In particular, in accordance with the determined preliminary position, the moveable device identifies (608) a cell of a predefined set of geographical cells, which collectively correspond to a geographic area that includes a plurality of tectonic terrestrial plates. As described above with reference to FIGS. 4A-4D and FIG. 5, the identified cell corresponds to a geographic region that includes the determined preliminary position. As described above with reference to FIGS. 4A and 5, the identified cell is identified by applying a predefined mathematical function to the determined preliminary position. Furthermore, the predefined set of geographical cells includes more single-plate cells, which each correspond to a geographic region that falls within a single respective tectonic terrestrial plate of the plurality of tectonic terrestrial plates, than multi-plate cells, which each correspond to a geographic region having two or more sub-regions that fall within distinct tectonic terrestrial plates of the plurality of tectonic terrestrial plates.

Once a cell has been identified (608), the moveable device obtains (610), from a database, pre-computed tectonic terrestrial plate position information for the identified cell. FIG. 4A shows an example of such a database, and as shown in FIG. 4A, the database includes tectonic plate information for each cell of the predefined set of geographical cells.

Based on the obtained pre-computed tectonic terrestrial plate position information for the identified cell, the moveable device identifies (612) a tectonic terrestrial plate, of the plurality of tectonic terrestrial plates, corresponding to the determined preliminary position of the moveable object. This is described in more detail above with reference to operation 512 (FIG. 5A), when the identified cell is single-plate cell, and operation 518 (FIG. 5A), when the identified cell is a multi-plate cell.

As described above with reference to operation 520 of method 500 (FIG. 5A), based on the identified tectonic terrestrial plate, the moveable object determines (614) a position correction, the position correction corresponding to the identified tectonic terrestrial plate and a reference epoch. Furthermore, as described above with reference to operation 522 of method 500 (FIG. 5A), the moveable object generates (616) a corrected position of the moveable object in accordance with the determined preliminary position of the moveable object and the determined position correction.

In some embodiments, the predefined set of geographical cells includes (620) more than 15,000 distinct cells corresponding to distinct geographic regions of the geographic area, each distinct cell of the predefined set of geographical cells corresponds to a range of latitudes that does not exceed two degrees, and each distinct cell of the predefined set of geographical cells, other than cells corresponding to geographic regions that overlap the North and South poles of Earth, further corresponds to a range of longitudes that does not exceed two degrees. As discussed above, in some embodiments, cells for the geographic regions that overlap the North and South poles are merged, since they are all single-plate cells and all correspond to relatively small geographic areas compared to the cells for other geographic regions of Earth. However, in some other embodiments, cells corresponding to geographic regions that overlap the North and South poles of Earth are not merged, and in such embodiments having more than 15,000 distinct cells, each distinct cell of the predefined set of geographical cells corresponds to a range of latitudes that does not exceed two degrees, and each distinct cell of the predefined set of geographical cell further corresponds to a range of longitudes that does not exceed two degrees.

In some embodiments, the database is a database internally stored (622) within a non-transitory computer readable storage medium of the moveable object. For example, in the system shown in FIG. 3, memory 210 includes a non-transitory computer readable medium (e.g., non-volatile memory), and the position to plate mapping database 224 is stored in that non-transitory computer readable medium.

In some embodiments, the predefined set of geographical cells includes (624) a first set of the single-plate cells, each single-plate cell corresponding to a geographic region that falls entirely within a single respective tectonic terrestrial plate of the plurality of tectonic terrestrial plates, and, for each single-plate cell in the first set of single-plate cells, the database includes information identifying the single respective tectonic terrestrial plate. For example, in FIG. 4A, cell 2 is an example of a single-plate cell. Furthermore, the predefined set of geographical cells includes (626) a second set of the multi-plate cells, each multi-plate cell corresponding to a geographic region having two or more sub-regions that fall within distinct tectonic terrestrial plates of the plurality of tectonic terrestrial plates, and, for each multi-plate cell in the second set of multi-plate cells, the database includes information identifying, for each sub-region of the two or more sub-regions corresponding to the multi-plate cell, a respective tectonic terrestrial plate and corresponding geographic boundaries. For example, in FIG. 4A, cell x and cell y are examples of multi-plate cells, each corresponding to a geographic region having two or more sub-regions that fall within distinct tectonic terrestrial plates of the plurality of tectonic terrestrial plates. Furthermore, each of the database entries 410-x and 410-y, for cell x and cell y, respectively, includes information identifying, for each sub-region of the two or more sub-regions corresponding to the multi-plate cell, a respective tectonic terrestrial plate and corresponding geographic boundaries.

In some embodiments, as shown in FIGS. 4A and 4B-4D, the database includes (630) information identifying two or more polygons for each multi-plate cell in the second set of multi-plate cells, each polygon having an internal area corresponding to a respective sub-region of the geographic region for a respective multi-plate cell.

In some embodiments, determining, when the identified cell is multi-plate cell, which of the two of more sub-regions corresponding to the identified cell includes the determined preliminary position of the moveable object includes (632) comparing the determined preliminary position with at least one polygon of the two or more polygons for the identified cell, until a determination is made as to which of the two or more polygons for the identified cell includes the determined preliminary position. For example, referring to FIG. 4A, if the identified cell is cell y, determining the sub-region of cell y that includes the preliminary position include comparing the preliminary position with at least one of the three polygons identified by the database entry 410-*y* for cell y. Furthermore, as shown in FIG. 4A, in some embodiments, the information (in the database) identifying two or more polygons for each multi-plate cell in the second set of multi-plate cells includes an ordered list of polygons for each multi-plate cell (e.g., polygons 4, 5 and 6 for cell y) in the second set of multi-plate cells, and information identifying a single respective tectonic terrestrial plate as corresponding to each polygon (e.g., plate 12 for polygon 4, plate 13 for polygon 5, and plate 13 for polygon 6).

In some embodiments, method 600 includes generating (636), from the satellite navigation signals received from the plurality of satellites, and the satellite orbit correction information and satellite clock correction information for the plurality of satellites, satellite navigation data for the moveable object, the satellite navigation data for the moving object including code measurements and carrier phase measurements each satellite of the plurality of satellites, and determining (638) the position of the moveable object from the code measurements and carrier phase measurements of the plurality of satellites. For example, when using an absolute mode of navigation, code measurement and carrier phase measurements are determined from the satellite navigation signals received from the plurality of satellites, and the satellite orbit correction information and satellite clock correction information for the plurality of satellites, and furthermore, the preliminary position of the moveable object is determined from the code measurements and carrier phase measurements of the plurality of satellites.

In some embodiments, when the identified cell is a multi-plate cell, the method includes (640) identifying the tectonic terrestrial plate, of the plurality of tectonic terrestrial plates, corresponding to the determined preliminary position of the moveable object by comparing the determined preliminary position with one or more polygons for the identified cell in an order specified by the ordered list of polygons for the identified cell. For example, with reference to FIG. 4A, the preliminary position of the moveable object may be compared with three polygons for cell y in the order that those polygons are listed in the database entry 410-*y* for cell y. Thus, in some embodiments, the polygons for a respective multi-plate cell are ordered, in the database entry for the cell, so that the order in which the polygons are compared with the preliminary position of the moveable object is, on average, computationally efficient. For example, if moveable objects in a respective cell have been found to be located least often in a particular sub-region of the respective cell (or, alternatively, are predicted to be found least often in that particular sub-region), then the polygon corresponding to that sub-region would be stored as the last polygon in the ordered list of polygons for the respective cell.

In some embodiments, the information in the internal database for each multi-plate cell in the second set of multi-plate cells includes (642) a number of polygons (e.g., three polygons for cell y, FIG. 4A) for the multi-plate cell, and further includes a number (e.g., a polygon count of 3), comprising a positive integer greater than one, corresponding to the number of polygons identified by the database for the multi-plate cell. Furthermore, as discussed above with reference to operations 514 and 516 of method 500 (FIG. 5A), in some embodiments, when the identified cell is a multi-plate cell, the method includes (644) determining the number, N, of polygons identified by information in the database for the identified cell, and identifying the tectonic terrestrial plate, of the plurality of tectonic terrestrial plates, corresponding to the determined preliminary position of the moveable object by comparing the determined preliminary position with no more than N−1 of the polygons for the identified cell.

In some embodiments, identifying the tectonic terrestrial plate, of the plurality of tectonic terrestrial plates, corresponding to the determined preliminary position of the moveable object includes (650) distinct operations when the identified cell is a single-plate cell and when the identified cell is a multi-plate cell. In particular, when the identified cell is a single-plate cell, the method includes identifying (652), from the obtained pre-computed tectonic terrestrial plate position information for the identified cell, the single tectonic terrestrial plate corresponding to the identified cell. The identified single tectonic terrestrial plate corresponding to the identified cell is identified as the tectonic terrestrial plate corresponding to the determined preliminary position of the moveable object.

When the identified cell is a multi-plate cell, identifying the tectonic terrestrial plate corresponding to the determined preliminary position of the moveable object includes determining (654) which sub-region, of the two of more sub-regions corresponding to the identified cell, includes the determined preliminary position of the moveable object. Based on the determined sub-region, the method includes identifying, from the obtained pre-computed tectonic terrestrial plate position information for the identified cell, the tectonic terrestrial plate corresponding to the determined sub-region of the two of more sub-regions corresponding to the identified cell. The identified tectonic terrestrial plate corresponding to the determined sub-region is identified as the tectonic terrestrial plate corresponding to the determined preliminary position of the moveable object.

It will be understood that although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A navigation system, comprising:
   one or more hardware processors; and
   memory storing one or more programs, and further storing a database having pre-computed tectonic terrestrial plate position information for each cell of a predefined set of geographical cells, which collectively correspond to a geographic area that includes a plurality of tectonic terrestrial plates, each cell of the predefined set of geographical cells corresponding to a geographic region;
   wherein, the one or more programs include instructions that, when executed by the one or more hardware processors, cause the navigation system to:
      determine a preliminary position of a moveable object, using information received from a navigation signal receiver for the moveable object;
      in accordance with the determined preliminary position, identify a cell of a predefined set of geographical cells, which collectively correspond to a geographic area that includes a plurality of tectonic terrestrial plates, the identified cell corresponding to a geographic region that includes the determined preliminary position, wherein the identified cell is identified by applying a predefined mathematical function to the determined preliminary position, and the predefined set of geographical cells includes more single-plate cells, which each correspond to a geographic region that falls within a single respective tectonic terrestrial plate of the plurality of tectonic terrestrial plates, than multi-plate cells, which each correspond to a geographic region having two or more sub-regions that fall within distinct tectonic terrestrial plates of the plurality of tectonic terrestrial plates;
      obtain, from the database, established prior to determination of the preliminary position of the moveable object, pre-computed tectonic terrestrial plate position information for the identified cell;
      based on the obtained pre-computed tectonic terrestrial plate position information for the identified cell, identify a tectonic terrestrial plate, of the plurality of tectonic terrestrial plates, corresponding to the determined preliminary position of the moveable object;
      based on the identified tectonic terrestrial plate, determine a position correction, the position correction corresponding to the identified tectonic terrestrial plate and a reference epoch; and
      generate a corrected position of the moveable object in accordance with the determined preliminary position of the moveable object and the determined position correction.

2. The navigation system of claim 1, wherein the database is a database internally stored within a non-transitory computer readable storage medium of the moveable object.

3. The navigation system of claim 1, wherein the predefined set of geographical cells includes a first set of the single-plate cells, each single-plate cell corresponding to a geographic region that falls entirely within a single respective tectonic terrestrial plate of the plurality of tectonic terrestrial plates, and, for each single-plate cell in the first set of single-plate cells, the database includes information identifying the single respective tectonic terrestrial plate, and
   wherein the predefined set of geographical cells includes a second set of the multi-plate cells, each multi-plate cell corresponding to a geographic region having two or more sub-regions that fall within distinct tectonic terrestrial plates of the plurality of tectonic terrestrial plates, and, for each multi-plate cell in the second set of multi-plate cells, the database includes information identifying, for each sub-region of the two or more sub-regions corresponding to the multi-plate cell, a respective tectonic terrestrial plate and corresponding geographic boundaries.

4. The navigation system of claim 3, wherein identifying the tectonic terrestrial plate, of the plurality of tectonic terrestrial plates, corresponding to the determined preliminary position of the moveable object includes:
   when the identified cell is a single-plate cell, identifying, from the obtained pre-computed tectonic terrestrial plate position information for the identified cell, the single tectonic terrestrial plate corresponding to the identified cell, wherein the identified single tectonic terrestrial plate corresponding to the identified cell is identified as the tectonic terrestrial plate corresponding to the determined preliminary position of the moveable object; and
   when the identified cell is a multi-plate cell, determining which sub-region, of the two of more sub-regions corresponding to the identified cell, includes the determined preliminary position of the moveable object, and based on the determined sub-region, identifying, from the obtained pre-computed tectonic terrestrial plate position information for the identified cell, the tectonic terrestrial plate corresponding to the determined sub-region of the two of more sub-regions corresponding to the identified cell, wherein the identified tectonic terrestrial plate corresponding to the determined sub-region is identified as the tectonic terrestrial plate corresponding to the determined preliminary position of the moveable object.

5. The navigation system of claim 4, wherein
   the database includes information identifying two or more polygons for each multi-plate cell in the second set of multi-plate cells, each polygon having an internal area corresponding to a respective sub-region of the geographic region for a respective multi-plate cell; and determining, when the identified cell is a multi-plate cell, which of the two or more sub-regions corresponding to the identified cell includes the determined preliminary position of the moveable object includes: comparing the determined preliminary position with at least one polygon of the two or more polygons for the identified cell, until a determination is made as to which of the two or more polygons for the identified cell includes the determined preliminary position.

6. The navigation system of claim 5, wherein the information identifying two or more polygons for each multi-plate cell in the second set of multi-plate cells comprises an ordered list of polygons for each multi-plate cell in the second set of multi-plate cells, and information identifying a single respective tectonic terrestrial plate, of the plurality of tectonic terrestrial plates, as corresponding to each polygon.

7. The navigation system of claim 6, wherein the one or more programs include instructions that when executed by the one or more hardware processors of the navigation system cause the navigation system, when the identified cell is a multi-plate cell, to identify the tectonic terrestrial plate, of the plurality of tectonic terrestrial plates, corresponding to the determined preliminary position of the moveable object by comparing the determined preliminary position with one or more polygons for the identified cell in an order specified by the ordered list of polygons for the identified cell.

8. The navigation system of claim 6, wherein the information in the database for each multi-plate cell in the second set of multi-plate cells includes a number, N, of polygons for the multi-plate cell, N comprising a positive integer greater than one; and the one or more programs include instructions that when executed by the one or more hardware processors of the navigation system cause the navigation system, when the identified cell is a multi-plate cell, to determine the number, N, of polygons for the identified cell, and identify the tectonic terrestrial plate, of the plurality of tectonic terrestrial plates, corresponding to the determined preliminary position of the moveable object by comparing the determined preliminary position with no more than N−1 of the polygons for the identified cell.

9. The navigation system of claim 1, wherein determining a preliminary position of the moveable object, using information received from the navigation signal receiver for the moveable object, includes:

generating, from satellite navigation signals received by the navigation signal receiver for the moveable object from a plurality of satellites, and satellite orbit correction information and satellite clock correction information for the plurality of satellites, satellite navigation data for the moveable object, the satellite navigation data for the moveable object including code measurements and carrier phase measurements for each satellite of the plurality of satellites; and determining the preliminary position of the moveable object from the code measurements and carrier phase measurements of the plurality of satellites.

10. The navigation system of claim 1, wherein the one or more programs include instructions that when executed by the one or more hardware processors of the navigation system cause the navigation system to convey the corrected position of the moveable object to an external system, external to the navigation system.

11. A non-transitory computer readable storage medium storing one or more programs for execution by a navigation system having one or more hardware processors, and further storing a database have pre-computed tectonic terrestrial plate position information for each cell of a predefined set of geographical cells, which collectively correspond to a geographic area that includes a plurality of tectonic terrestrial plates, each cell of the predefined set of geographical cells corresponding to a geographic region; and a housing that encloses at least the one or more hardware processors and memory;

the one or more programs including instructions that when executed by the one or more hardware processors of the navigation system cause the navigation system to:

determine a preliminary position of a moveable object, using navigation signals received using a navigation signal receiver for the moveable object;

in accordance with the determined preliminary position, identify a cell of a predefined set of geographical cells, which collectively correspond to a geographic area that includes a plurality of tectonic terrestrial plates, the identified cell corresponding to a geographic region that includes the determined preliminary position of the moveable object, wherein the identified cell is identified by applying a predefined mathematical function to the determined preliminary position, and the predefined set of geographical cells includes more single-plate cells, which each correspond to a geographic region that falls within a single respective tectonic terrestrial plate of the plurality of tectonic terrestrial plates, than multi-plate cells, which each correspond to a geographic region having two or more sub-regions that fall within distinct tectonic terrestrial plates of the plurality of tectonic terrestrial plates;

obtain, from the database, established prior to determination of the preliminary position of the moveable object, pre-computed tectonic terrestrial plate position information for the identified cell;

based on the obtained pre-computed tectonic terrestrial plate position information for the identified cell, identify a tectonic terrestrial plate, of the plurality of tectonic terrestrial plates, corresponding to the determined preliminary position of the moveable object;

based on the identified tectonic terrestrial plate, determine a position correction, the position correction corresponding to the identified tectonic terrestrial plate and a reference epoch; and generate a corrected position of the moveable object in accordance with the determined preliminary position of the moveable object and the determined position correction.

12. The non-transitory computer readable storage medium of claim 11, wherein the database is a database internally stored within a non-transitory computer readable storage medium of the moveable object.

13. The non-transitory computer readable storage medium of claim 11, wherein the predefined set of geographical cells includes a first set of the single-plate cells, each single-plate cell corresponding to a geographic region that falls entirely within a single respective tectonic terrestrial plate of the plurality of tectonic terrestrial plates, and, for each single-plate cell in the first set of single-plate cells, the database includes information identifying the single respective tectonic terrestrial plate, and wherein the predefined set of geographical cells includes a second set of the multi-plate cells, each multi-plate cell corresponding to a geographic region having two or more sub-regions that fall within distinct tectonic terrestrial plates of the plurality of tectonic terrestrial plates, and, for each multi-plate cell in the second set of multi-plate cells, the database includes information identifying, for each sub-region of the two or more sub-regions corresponding to the multi-plate cell, a respective tectonic terrestrial plate and corresponding geographic boundaries.

14. The non-transitory computer readable storage medium of claim 13, wherein identifying the tectonic terrestrial plate, of the plurality of tectonic terrestrial plates, corresponding to the determined preliminary position of the moveable object includes:
  when the identified cell is a single-plate cell, identifying, from the obtained pre-computed tectonic terrestrial plate position information for the identified cell, the single tectonic terrestrial plate corresponding to the identified cell, wherein the identified single tectonic terrestrial plate corresponding to the identified cell is identified as the tectonic terrestrial plate corresponding to the determined preliminary position of the moveable object; and
  when the identified cell is a multi-plate cell, determining which sub-region, of the two of more sub-regions corresponding to the identified cell, includes the determined preliminary position of the moveable object, and based on the determined sub-region, identifying, from the obtained pre-computed tectonic terrestrial plate position information for the identified cell, the tectonic terrestrial plate corresponding to the determined sub-region of the two of more sub-regions corresponding to the identified cell, wherein the identified tectonic terrestrial plate corresponding to the determined sub-region is identified as the tectonic terrestrial plate corresponding to the determined preliminary position of the moveable object.

15. The non-transitory computer readable storage medium of claim 14, wherein
  the database includes information identifying two or more polygons for each multi-plate cell in the second set of multi-plate cells, each polygon having an internal area corresponding to a respective sub-region of the geographic region for a respective multi-plate cell; and
  determining, when the identified cell is a multi-plate cell, which of the two or more sub-regions corresponding to the identified cell includes the determined preliminary position of the moveable object includes: comparing the determined preliminary position with at least one polygon of the two or more polygons for the identified cell, until a determination is made as to which of the two or more polygons for the identified cell includes the determined preliminary position.

16. The non-transitory computer readable storage medium of claim 15, wherein the information identifying two or more polygons for each multi-plate cell in the second set of multi-plate cells comprises an ordered list of polygons for each multi-plate cell in the second set of multi-plate cells, and information identifying a single respective tectonic terrestrial plate, of the plurality of tectonic terrestrial plates, as corresponding to each polygon.

17. The non-transitory computer readable storage medium of claim 16, wherein the one or more programs include instructions that when executed by the one or more hardware processors of the navigation system cause the navigation system, when the identified cell is a multi-plate cell, to identify the tectonic terrestrial plate, of the plurality of tectonic terrestrial plates, corresponding to the determined preliminary position of the moveable object by comparing the determined preliminary position with one or more polygons for the identified cell in an order specified by the ordered list of polygons for the identified cell.

18. The non-transitory computer readable storage medium of claim 16, wherein the information in the database for each multi-plate cell in the second set of multi-plate cells includes a number, N, of polygons for the multi-plate cell, N comprising a positive integer greater than one; and
  the one or more programs include instructions that when executed by the one or more hardware processors of the navigation system cause the navigation system, when the identified cell is a multi-plate cell, to determine the number, N, of polygons for the identified cell, and identify the tectonic terrestrial plate, of the plurality of tectonic terrestrial plates, corresponding to the determined preliminary position of the moveable object by comparing the determined preliminary position with no more than N−1 of the polygons for the identified cell.

19. The non-transitory computer readable storage medium of claim 11, wherein determining a preliminary position of the moveable object, using information received from the navigation signal receiver for the moveable object, includes:
  generating, from satellite navigation signals received by the navigation signal receiver for the moveable object from a plurality of satellites, and satellite orbit correction information and satellite clock correction information for the plurality of satellites, satellite navigation data for the moveable object, the satellite navigation data for the moveable object including code measurements and carrier phase measurements for each satellite of the plurality of satellites; and
  determining the preliminary position of the moveable object from the code measurements and carrier phase measurements of the plurality of satellites.

20. The non-transitory computer readable storage medium of claim 11, wherein the one or more programs include instructions that when executed by the one or more hardware processors of the navigation system cause the navigation system to convey the corrected position of the moveable object to an external system, external to the navigation system.

* * * * *